US009157009B2

(12) United States Patent
Maliverney et al.

(10) Patent No.: US 9,157,009 B2
(45) Date of Patent: Oct. 13, 2015

(54) USES OF CARBENES IN SOLUTION AS ORGANOPOLYSILOXANE POLYCONDENSATION CATALYSTS

(75) Inventors: Christian Maliverney, Saint Julien sur Bibost (FR); Laurent Saint-Jalmes, Vourles (FR)

(73) Assignee: Bluestar Silicones France SAS, Lyons (FR)

( * ) Notice: Subject to any disclaimer, the term of this patent is extended or adjusted under 35 U.S.C. 154(b) by 0 days.

(21) Appl. No.: 14/130,785

(22) PCT Filed: Jul. 6, 2012

(86) PCT No.: PCT/FR2012/000269
§ 371 (c)(1),
(2), (4) Date: Apr. 28, 2014

(87) PCT Pub. No.: WO2013/004925
PCT Pub. Date: Jan. 10, 2013

(65) Prior Publication Data
US 2014/0227449 A1    Aug. 14, 2014

(30) Foreign Application Priority Data
Jul. 7, 2011  (FR) ..................... 11 56171

(51) Int. Cl.
| C08G 77/08 | (2006.01) |
| C09D 183/04 | (2006.01) |
| C08L 83/04 | (2006.01) |
| C08L 83/06 | (2006.01) |
| C09D 183/06 | (2006.01) |
| C08K 5/3445 | (2006.01) |

(52) U.S. Cl.
CPC ............... C09D 183/04 (2013.01); C08L 83/04 (2013.01); C08L 83/06 (2013.01); C09D 183/06 (2013.01); C08K 5/3445 (2013.01)

(58) Field of Classification Search
CPC ..... C09D 183/06; C08L 83/06; C08K 5/3445
USPC .......................................................... 528/12
See application file for complete search history.

(56) References Cited

U.S. PATENT DOCUMENTS

| 4,515,932 | A | 5/1985 | Chung |
| 4,528,353 | A | 7/1985 | Lucas et al. |
| 4,563,498 | A | 1/1986 | Lucas |
| 5,077,414 | A | 12/1991 | Arguengo, III |
| 5,519,104 | A | 5/1996 | Lucas |
| 2006/0084753 | A1 | 4/2006 | Dumont et al. |
| 2006/0173150 | A1* | 8/2006 | Brummer et al. ............... 528/15 |
| 2009/0264563 | A1* | 10/2009 | Blanc-Magnard et al. ... 524/106 |
| 2009/0299024 | A1* | 12/2009 | Baceiredo et al. .............. 528/12 |
| 2012/0172471 | A1 | 7/2012 | Maliverney |

FOREIGN PATENT DOCUMENTS

| EP | 0885933 A1 | 12/1998 |
| FR | 978058 A | 4/1951 |
| FR | 1050108 A | 1/1952 |
| FR | 1025150 A | 4/1953 |
| FR | 1108764 A | 1/1956 |
| FR | 1126411 A | 11/1956 |
| FR | 1126884 A | 12/1956 |
| FR | 1136885 A | 5/1957 |
| FR | 1179969 A | 5/1959 |
| FR | 1189216 A | 10/1959 |
| FR | 1198749 A | 12/1959 |
| FR | 1236505 A | 7/1960 |
| FR | 1248826 A | 12/1960 |
| FR | 1314649 A | 1/1963 |
| FR | 1370884 A | 8/1964 |
| FR | 1423477 A | 1/1966 |
| FR | 1432799 A | 3/1966 |
| FR | 2067636 A5 | 8/1971 |
| FR | 2557582 A1 | 7/1985 |
| FR | 2786497 A1 | 6/2000 |
| FR | 2900153 A | 10/2007 |
| GB | 1024234 A | 3/1966 |
| WO | 2010149869 A1 | 12/2010 |

OTHER PUBLICATIONS

Freeman (Silicones, Published for The Plastics Institute, ILIFFE Ltd., 1962).*
Coulembier (Macromolecules, 39 (2006) 5617-5628).*
Lohmeijer (Organic Letters, 8(21) (2006) 4683-4686).*
International Search Report, received in PCT/FR2012/000269, dated Feb. 13, 2013.

* cited by examiner

*Primary Examiner* — Kuo-Liang Peng
(74) *Attorney, Agent, or Firm* — Miles & Stockbridge P.C.

(57) ABSTRACT

The invention relates to the use of novel stable carbenes in solution as organopolysiloxane polycondensation catalysts.

20 Claims, No Drawings

USES OF CARBENES IN SOLUTION AS ORGANOPOLYSILOXANE POLYCONDENSATION CATALYSTS

CROSS REFERENCE TO RELATED APPLICATIONS

This application is a §371 National Stage Application of PCT/FR2012/000269, filed Jul. 6, 2012, which claims priority to FR 11 56171, filed Jul. 7, 2011.

BACKGROUND OF THE INVENTION

1. Field of the Invention

The present invention relates to an organopolysiloxane composition that can be vulcanized at room temperature into an elastomer that polymerizes or crosslinks by polycondensation and that does not contain alkyltin-based catalysts which exhibit toxicity problems.

2. Description of Related Art

The invention also relates to the use of novel catalytic polycondensation compositions which have a carbene structure and are stable in solution, as organopolysiloxane polycondensation reaction catalysts.

Elastomer formulations that crosslink via polycondensation generally involve a silicone oil, generally a polydimethylsiloxane, with hydroxyl end groups, optionally prefunctionalized by a silane so as to have alkoxy ends, a crosslinking agent, a polycondensation catalyst, conventionally a tin salt or an alkyl titanate, a reinforcing filler and other optional additives such as bulking fillers, adhesion promoters, colorants, biocidal agents, etc.

These organopolysiloxane compositions that can be vulcanized at room temperature are well known and are classified into 2 different groups: single-component compositions (RTV-1) and two-component compositions (RTV-2).

The term "RTV" is the acronym for "Room Temperature Vulcanizing".

During crosslinking, water (either provided by atmospheric moisture in the case of RTV-1 compositions, or introduced into one part of the composition in the case of RTV-2 compositions) enables the polycondensation reaction, which results in the formation of the elastomeric network.

Generally, single-component (RTV-1) compositions crosslink when they are exposed to moisture from the air, that is to say that they cannot crosslink in an enclosed medium. For example, the single-component silicone compositions used as sealants or cold-setting adhesives follow a mechanism of hydrolysis of reactive functional groups of the acetoxysilane, ketiminoxysilane, alkoxysilane, etc. type, followed by condensation reactions between the silanol groups formed and other residual reactive functional groups. The hydrolysis is generally carried out by virtue of water vapor which diffuses into the material from the surface exposed to the atmosphere. Generally, the kinetics of the polycondensation reactions is extremely slow; these reactions are therefore catalyzed by a suitable catalyst. As catalysts which are used, use is most often made of catalysts based on tin, titanium, an amine or compositions of these catalysts. Catalysts based on tin (cf. in particular FR-A-2 557 582) and on titanium (cf. in particular FR-A-2 786 497) are catalysts that are very effective.

As regards two-component compositions, they are sold and stored in the form of two components, a first component containing the base polymer materials and the second component containing the catalyst. The two components are mixed at the moment of use and the mixture crosslinks in the form of a relatively hard elastomer. These two-component compositions are well known and are described, in particular, in the book by Walter Noll "Chemistry and Technology of Silicones" 1968, 2nd Edition, on pages 395 to 398. These compositions essentially comprise 4 different ingredients:

a reactive α,ω-dihydroxydiorganopolysiloxane polymer,
a crosslinking agent, generally a silicate or a polysilicate,
a tin catalyst, and
water.

Usually, the condensation catalyst is based on an organic tin compound. Indeed, many tin-based catalysts have already been proposed as a catalyst for crosslinking these RTV-1 or RTV-2 compositions. Conventional polycondensation catalysts comprise dialkyltin compounds, in particular dialkyltin dicarboxylates such as dibutyltin dilaurate and diacetate, alkyl titanate compounds such as tetrabutyl or tetraisopropyl titanate, and titanium chelates (EP-A-0 885 933, U.S. Pat. No. 5,519,104, U.S. Pat. No. 4,515,932, U.S. Pat. No. 4,563,498, U.S. Pat. No. 4,528,353).

However, the alkyltin-based catalysts, although very effective, usually colorless, liquid and soluble in silicone oils, have the drawback of being toxic (CMR2 toxic for reproduction).

Another important aspect for an organopolysiloxane polycondensation reaction catalyst is the pot life, that is to say the time during which the composition can be used after mixing without curing. This time must be long enough to allow it to be used, but short enough to obtain a molded article that can be handled at the latest a few minutes or a few hours after it has been manufactured. The catalyst must thus make it possible to obtain a good compromise between the pot life of the catalyzed mixture and the time at the end of which the molded article can be handled (these times depend on the targeted application such as, for example, the molding or manufacture of seals). In addition, the catalyst must confer, on the catalyzed mixture, a spreading time which does not vary as a function of the storage time.

Application FR 03 41232 relates to a process for preparing a polyorganosiloxane by polymerization via ring opening and/or redistribution of polyorganosiloxane, in the presence of a catalyst (or initiator) consisting of at least one nucleophilic carbene.

Application FR 06 03563 relates to a process for polycondensation of polyorganosiloxanes also using catalysts with a carbene structure.

The carbene catalysts described in the abovementioned two applications are unstable and must generally be either used in a crystalline form, or generated in situ from to precursor salts. As it happens, carbenes are highly reactive species that degrade in the open air, which implies storing them and handling them under an inert atmosphere.

SUMMARY

One of the objectives of the present invention is to provide a catalyst for organopolysiloxane polycondensation that is nontoxic, stable in the open air for several months and, consequently, easily transportable, thereby enabling easy industrial use without requiring additional steps for generating it in situ.

Another of the objectives of the present invention is to provide a catalyst that is nontoxic but that continues to simultaneously meet the constraints of storage, of processing and of polymerization or crosslinking by polycondensation, while at the same time being usable whatever the type of crosslinking used.

Another objective of the present invention is to provide a novel nontoxic catalyst that enables surface crosslinking and also core crosslinking that is as complete as possible.

Another objective of the present invention is also to provide novel catalysts that enable polyorganosiloxane compositions to polymerize or crosslink in the presence of moisture from the air or water.

Another objective of the present invention is to provide a novel nontoxic catalyst for organopolysiloxane polycondensation, that is inexpensive to synthesize since it does not have the constraints of the prior art catalysts with a carbene structure, in particular associated with their instability, and requiring synthesis in an anhydrous medium and/or a purification step by sublimation with very low yields.

These objectives, among others, are achieved by the present invention, which relates first of all to a silicone-based elastomer precursor composition X comprising:

a silicone base B comprising at least one polyorganosiloxane oil or gum C, said oil or gum C being (i) polymerizable or crosslinkable via a polycondensation reaction and having (ii) a dynamic viscosity of between 10 mPa·s and $1.5 \times 10^6$ mPa·s at 25° C.; and a catalytic composition Y' comprising:
a) a catalytically effective amount of at least one polycondensation catalyst A which is a carbene of formula (I) below:

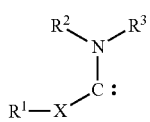

(I)

with:
the symbol X being chosen from the group consisting of the following atoms or groups: —O—, —S—, —N(R)— and —P(R)— with R being a $C_1$-$C_{30}$ group, $R^1$, $R^2$ and $R^3$ being identical or different, optionally substituted, $C_1$-$C_{30}$ groups optionally comprising one or more atoms chosen from the group consisting of: S, P, Si, N and O, the symbols X, $R^1$, $R^2$ and $R^3$ taken in pairs can form a 5-, 6- or 7-membered ring, and b) at least one solvent comprising at least one alcohol G.

DETAILED DESCRIPTION OF A PREFERRED EMBODIMENT

In order to achieve this objective, the Applicant has, to its credit, demonstrated, entirely surprisingly and unexpectedly, that the use of a carbene that is stable in solution makes it possible to catalyze the organopolysiloxane polycondensation reaction for the polymerization or crosslinking of elastomer precursor silicone compositions, for example for obtaining sealants or coated supports.

It is understood that the term "elastomer" is taken in the sense given to it in the silicone field and which describes the product obtained after curing a silicone composition without any implications regarding its elasticity properties.

Preferably, the catalytic composition is composed exclusively of one or more alcohol G and of the polycondensation catalyst A according to the invention. The alcohol G will be present in the catalytic composition Y' in a proportion of at least 50% by weight relative to the total weight of said catalytic composition Y', and preferably of at least 55% by weight and even more preferentially in a proportion of at least 60% by weight relative to the total weight of said catalytic composition Y'.

Processes for preparing carbenes that are stable in solution in a solvent comprising at least one alcohol (alcoholic solution) are described in application FR 10 50108. Such a process consists in preparing the carbene by deprotonation of a precursor salt using at least one strong base optionally generated in situ, said deprotonation being carried out in a solvent comprising at least one alcohol.

More specifically, a process for preparing a catalytic composition Y' according to the invention comprises the following steps:

a) at least one strong base, optionally generated in situ, is reacted, preferably at a temperature between 0° C. and 100° C., with at least one carbene precursor compound A' of formula (I), said compound A' being a salt comprising an iminium function of structure (I') below:

(I')

with:
the symbol X being chosen from the group consisting of the following atoms or groups: —O—, —S—, —N(R)— and —P(R)—, with the symbol R being a $C_1$-$C_{30}$ group, the symbols $R^1$, $R^2$ and $R^3$ being identical or different, optionally substituted, $C_1$-$C_{30}$ groups optionally comprising one or more atoms chosen from the group consisting of: S, P, Si, N and O, and the symbols X, $R^1$, $R^2$ and $R^3$ taken in pairs can form a 5-, 6- or 7-membered ring;

with the following conditions:
the strong base is chosen so as to be able to carry out a deprotonation of the hydrogen of the iminium function of structure (I'), and the reaction is carried out in a solvent which is an alcohol or an alcohol mixture.

Advantageously, this deprotonation is carried out at room temperature (20° C.).

Preferably, the compound A' is chosen from the compounds of general formula (III) or (III') below:

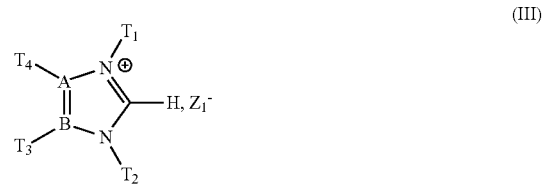

(III)

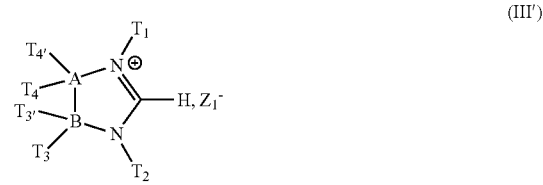

(III')

in which:
the symbols A and B independently represent a carbon or nitrogen atom, it being understood that:
in formula (III), when the symbol A represents a nitrogen atom, then the symbol $T_4$ is not present, and when the symbol B represents a nitrogen atom, then the symbol $T_3$ is not present;
in formula (III'), when the symbol A represents a nitrogen atom, then the symbol $T_4$ or $T_{4'}$ is not present, and when the symbol B represents a nitrogen atom, then the symbol $T_3$ or $T_{3'}$ is not present;
the symbols $T_3$, $T_{3'}$, $T_4$ and $T_{4'}$ represent, independently of one another, a hydrogen atom; or one of the following groups: alkyl, cycloalkyl optionally substituted with an alkyl or alkoxy group, aryl optionally substituted with an alkyl or alkoxy group, alkenyl, alkynyl or arylalkyl in which the aryl part is optionally substituted with an alkyl or alkoxy group;
the symbols $T_3$ and $T_4$ can form, together and with A and B when the latter each represent a carbon atom, an aryl, it being understood that, in this case, $T_{3'}$ and $T_{4'}$ are not present;
the symbols $T_1$ and $T_2$ independently represent:
1) one of the following groups: alkyl, cycloalkyl optionally substituted with an alkyl, alkyl which is perfluorinated or optionally substituted with a perfluoroalkyl group, cycloalkyl optionally substituted with an alkyl or alkoxy group, aryl optionally substituted with an alkyl or alkoxy group, alkenyl, alkynyl or arylalkyl in which the aryl part is optionally substituted with an alkyl or alkoxy group; or
2) a monovalent radical of formula (IV) below:

—V1-V2 (IV)

in which:
the symbol V1 is a saturated or unsaturated divalent hydrocarbon-based group, preferably a linear or branched $C_1$-$C_{10}$ alkylene, which is optionally substituted,
the symbol V2 is a monovalent group chosen from the group of the following to substituents:
alkoxy, —$OR^a$ with the symbol $R^a$ corresponding to a hydrogen atom or an alkyl or aryl group;
silyl, —$Si(OR^b)_x(R^c)_{3-x}$ with the symbol $R^b$ corresponding to a hydrogen atom or an alkyl, silyl or siloxanyl group, the symbol $R^c$ corresponding to an alkyl or aryl group and the symbol x being an integer equal to 0, 1, 2 or 3;
amine, preferably —$N(R^a)_2$ with the symbol $R^a$ corresponding to a hydrogen atom or an alkyl or aryl group;
the substituents $T_1$, $T_2$, $T_3$, $T_{3'}$, $T_4$ and $T_{4'}$, can form, in pairs, when they are located on two adjacent ring members in formulae (III) and (III'), a saturated or unsaturated hydrocarbon-based chain,
the symbol Z1 independently represents an anion derived from a Brönsted acid (protic acid) preferably chosen from the group consisting of:
carboxylic acids of formula $G^o$-COOH in which the symbol $G^o$ represents an alkyl, and advantageously a $C_1$-$C_{22}$ alkyl; an aryl, advantageously a $C_6$-$C_{18}$ aryl optionally substituted with one or more $C_1$-$C_6$ alkyls;
sulfonic acids of formula $G^o$-$SO_3H$ in which the symbol $G^o$ is as defined above;
phosphoric acids of formula $G_o$-$PO_3H$ in which the symbol $G_o$ is as defined above;
the following inorganic acids: HF, HCl, HBr, HI, $H_2SO_4$, $H_3PO_4$, $HClO_4$ and $HBF_4$ taken alone or in combination with one another;
and mixtures thereof.

Regarding the salt (III), the anion $Z_1^-$ is the anion derived from an organic or inorganic Brönsted acid (protic acid). The anion $Z_1^-$ is usually derived from an acid with a pKa of less than 6. Preferably, $Z_1^-$ derives from an acid with a pKa of less than 4, even better still less than 2. The pKa values referred to here are the pKa values of the acids as measured in water.
Examples of acids are carboxylic acids of formula: $G^o$-COOH, in which the symbol $G^o$ represents an alkyl, for example $C_1$ to $C_{22}$ alkyl, group; an aryl, for example $C_6$ to $C_{18}$ aryl, group optionally substituted with one or more alkyls, preferably one or more ($C_1$-$C_6$)alkyls; sulfonic acids of formula: $G^o$-$SO_3H$, in which the symbol $G^o$ is as defined above; and phosphonic acids of formula: $G^o$-$PO_3H$ in which the symbol $G^o$ is as defined above; other acids are HF, HCl, HBr, $H_1$, $H_2SO_4$, $H_3PO_4$, $HClO_4$ and $HBF_4$.
Preferred examples of carboxylic acids are acetic acid, benzoic acid and stearic acid. By way of preferred sulfonic acid, mention will be made of benzenesulfonic acid, and by way of preferred phosphonic acid, mention will be made of phenylphosphonic acid.
The anions $Z_1^-$ derived from the acids HCl, HI, $HBF_4$ and $HPF_6$ are more particularly preferred.
Thus, anions $Z_1^-$ that are particularly preferred are the halide anions and the tetrafluoroborate and hexafluorophosphate.
Some examples of imidazolium salts are given below.

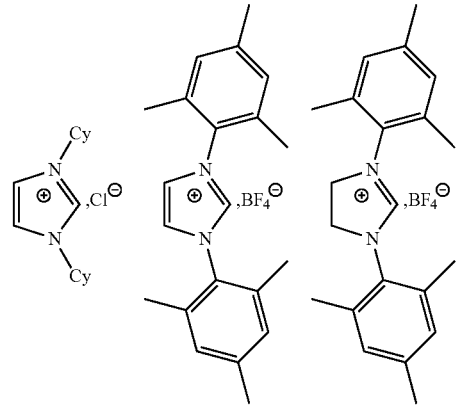

These consumables are either commercially available or are easily prepared by those skilled in the art from commercial compounds.
A method for synthesizing the salts of formula (III) in which A=B=C is described in U.S. Pat. No. 5,077,414.
This process comprises reacting:
⇒ an α-dicarbonylated compound of formula (V) below:

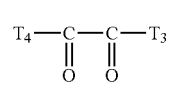 (V)

in which the symbols $T_3$ and $T_4$ are as defined above
⇒ with HCHO and two amines of formulae $T_1$-$NH_2$ and $T_2$-$NH_2$, in the presence of an appropriate acid. The symbols $T_1$ and $T_2$ are as defined above.
The nature of the anion $Z_1^-$ in the salts of formula (III) depends on the acid used in this step. The acids that can be used are, for example, those listed above and those from which $Z_1^-$ derives.

Other methods for preparing the salts of formula (III) are proposed in Chem. Eur. J. 1996, 2, No. 12, pages 1627-1636 and Angew. Chem. Int. Ed. Engl. 1997, 36, 2162-2187.

The reaction for preparing the carbenes used as catalysts is carried out in a solvent comprising at least one alcohol G or alcohol G mixture so as to obtain carbenes that are stable in an alcohol-based solution.

Preferably, the alcohol G in this solvent corresponds to the formula R°OH, in which R° corresponds to one of the following groups: alkyl, cycloalkyl, aryl, alkenyl, alkynyl, arylalkyl, silyl or siloxane, and preferably the symbol R° is chosen from the group consisting of: a methyl, an ethyl, a propyl and a butyl.

In one preferred embodiment, for the reaction for synthesizing the carbenes in solution, the strong base is chosen from the group of alkali metal or alkaline-earth metal hydroxides, alkoxides, hydrides or amides, preferably from the subgroup comprising: $CH_3ONa$, potassium tert-butylate, KOH, NaOH, $CH_3CH_2OMgOCH_2CH_3$ and mixtures thereof.

According to one eventuality, this strong base can be formed in situ, for example by adding sodium, or sodium hydride, or magnesium to the alcohol under consideration. It is in this way that the alkoxides can be generated in situ.

Advantageously, the deprotonation produces a salt which precipitates and which is separated from the carbene solution, said solution then being usable in the processes of the invention described hereinafter as catalytic composition Y'.

Preferably, the catalytic composition Y' according to the invention comprises a polycondensation catalyst A of formula (II) or (II'):

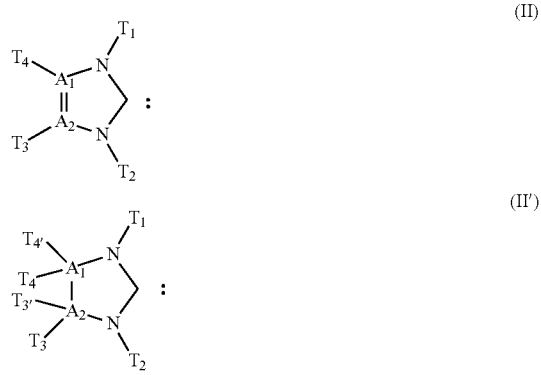

in which:
the symbols $A_1$ and $A_2$ independently represent a carbon or nitrogen atom, it being understood that:
1) in formula (II), when the symbol $A_1$ represents a nitrogen atom, then the symbol $T_4$ is not present, and when the symbol $A_2$ represents a nitrogen atom, then the symbol $T_3$ is not present; and
2) in formula (II'), when the symbol $A_1$ represents a nitrogen atom, then the symbol $T_4$ or $T_{4'}$ is not present, and when the symbol $A_2$ represents a nitrogen atom, then the symbol $T_3$ or $T_{3'}$ is not present;
the symbols $T_3$, $T_{3'}$, $T_4$ and $T_{4'}$ independently represent a hydrogen atom; or one of the following groups: alkyl, cycloalkyl optionally substituted with an alkyl or alkoxy group; aryl optionally substituted with an alkyl or alkoxy group, alkenyl, alkynyl or arylalkyl in which the aryl part is optionally substituted with an alkyl or alkoxy group;

the symbols $T_3$ and $T_4$ can form, together and with $A_1$ and $A_2$ when the latter each represent a carbon atom, an aryl, it being understood that, in this case, $T_{3'}$ and $T_{4'}$ are not present;
the symbols $T_1$, $T_2$, $T_3$, $T_{3'}$, $T_4$ and $T_{4'}$ can form, in pairs, when they are located on two adjacent ring members in formulae (II) and (II'), a saturated or unsaturated hydrocarbon-based chain, and
the symbols $T_1$ and $T_2$ represent, independently of one another:
1) one of the following groups: alkyl, a cycloalkyl optionally substituted with an alkyl group, alkyl which is perfluorinated or optionally substituted with a perfluoroalkyl group, cycloalkyl optionally substituted with an alkyl or alkoxy group; aryl optionally substituted with an alkyl or alkoxy group, alkenyl, alkynyl or arylalkyl in which the aryl part is optionally substituted with an alkyl or alkoxy group; or
2) a monovalent radical of formula (IV) below:

$$—V1-V2 \qquad (IV)$$

in which:
V1 is a saturated or unsaturated, divalent hydrocarbon-based group, preferably a linear or branched $C_1$-$C_{10}$ alkylene, which is optionally substituted, and
V2 is a monovalent group chosen from the group consisting of the following substituents:
alkoxy, —$OR^a$ with the symbol $R^a$ corresponding to a hydrogen atom or an alkyl or aryl group;
silyl, —$Si(OR^b)_x(R^c)_{3-x}$ with the symbol $R^b$ corresponding to a hydrogen atom or an alkyl, silyl or siloxanyl group, with the symbol $R^c$ corresponding to an alkyl or aryl group and the symbol x being an integer equal to 0, 1, 2 or 3; and
amine, preferably —$N(R^a)_2$ with the symbol $R^a$ corresponding to a hydrogen atom or to an alkyl or aryl group.

The term "alkyl" denotes a linear or branched, saturated hydrocarbon-based chain, which is optionally substituted (e.g. with one or more alkyls), preferably containing from 1 to 10 carbon atoms, for example from 1 to 8 carbon atoms and even better still from 1 to 7 carbon atoms.

Examples of alkyl groups are in particular methyl, ethyl, isopropyl, n-propyl, tert-butyl, isobutyl, n-butyl, n-pentyl, isoamyl and 1,1-dimethylpropyl. The alkyl part of the alkoxy group is as defined above.

The alkyl group which is perfluorinated or optionally substituted with a perfluoroalkyl group preferably corresponds to the formula:

$$—(CH_2)_p—C_qF_{2q+1}$$

in which the symbol p represents 0, 1, 2, 3 or 4; the symbol q is an integer from 1 to 10; and $C_qF_{2q+1}$ is linear or branched. Preferred examples of this group are: —$(CH_2)_2$—$(CF_2)_5$—$CF_3$ and —$(CF_2)_7$—$CF_3$.

The term "aryl" denotes a monocyclic or polycyclic, and preferably monocyclic or bicyclic, aromatic hydrocarbon-based group having from 6 to 18 carbon atoms. It should be understood that, in the context of the invention, the term "polycyclic aromatic group" is intended to mean a group which has two or more aromatic rings which are condensed (orthocondensed or ortho and pericondensed) with one another, i.e. having, in pairs, at least two carbons in common.

Said aromatic ("aryl") hydrocarbon-based group is optionally substituted, for example, with one or more $C_1$-$C_3$ alkyls, one or more halogenated hydrocarbon-based groups (e.g.

CF₃), one or more alkoxys (e.g. CH₃O) or one or more hydrocarbon-based groups comprising one or more ketone units (e.g. CH₃CO—).

By way of example of aryl, mention may be made of phenyl, naphthyl, anthryl and phenanthryl radicals.

The term "arylalkyl" denotes an alkyl group as defined above, substituted with one or more aryl groups on its hydrocarbon-based chain, the aryl group being as defined above. Examples thereof are benzyl and triphenylmethyl.

The term "cycloalkyl" is intended to mean a monocyclic or polycyclic, preferably monocyclic or bicyclic, saturated hydrocarbon-based group preferably having from 3 to 10 carbon atoms and even better still from 3 to 8. The term "polycyclic saturated hydrocarbon-based group" is intended to mean a group having two or more cyclic rings attached to one another via σ bonds and/or condensed in pairs. Examples of polycyclic cycloalkyl groups are adamantane and norbornane. Examples of monocyclic cycloalkyl groups are cyclopropyl, cyclobutyl, cyclopentyl, cyclohexyl, cycloheptyl and cyclooctyl.

The term "alkenyl" is intended to mean a substituted or unsubstituted, linear or branched, unsaturated hydrocarbon-based chain having at least one olefinic double bond, and more preferably just one double bond. Preferably, the alkenyl group has from 2 to 8 carbon atoms and even better still from 2 to 6. This hydrocarbon-based chain optionally comprises at least one heteroatom such as O, N or S. Preferred examples of alkenyl groups are allyl and homoallyl groups.

The term "alkynyl" is intended to mean, according to the invention, a substituted or unsubstituted, linear or branched, unsaturated hydrocarbon-based chain having at least one acetylenic triple bond, and more preferably just one triple bond. Preferably, the alkynyl group has from 2 to 8 carbon atoms and even better still from 2 to 6 carbon atoms. By way of example, mention may be made of the acetylenyl group and also the propargyl group.

This hydrocarbon-based chain optionally comprises at least one heteroatom such as O, N or S.

According to the invention, the term "silyl" is intended to mean a linear or branched group containing at least one silicon atom. Polydimethylsiloxane chains are examples of silyl groups.

The carbenes of formulae (II) and (II') can have at least two condensed rings, i.e. two groups at least among $T_1$, $T_2$, $T_3$, $T_{3'}$, $T_4$ and $T_{4'}$, located on two adjacent ring members, together form a saturated or unsaturated hydrocarbon-based chain preferably having from 3 to 6 carbon atoms. The term "saturated or unsaturated hydrocarbon-based chain" is intended to mean a linear or branched hydrocarbon-based chain which may or may not have one or more unsaturations of olefinic double bond or acetylenic triple bond type.

As regards the preferred embodiments in formula (II) or (II'), these are embodiments in which the symbol $A_1=A_2=$carbon atom in formula (II) given above.

Preferred meanings for the symbols $T_1$ and $T_2$ in this formula (II) are:
  alkyl, in particular n-propyl, n-pentyl, neopentyl (—CH₂—C(CH₃)₃);
  cycloalkyl, in particular cyclopentyl, cyclohexyl or adamantyl;
  alkenyl, in particular allyl (—CH₂—CH=CH₂), methallyl (—CH₂—C(CH₃)=CH₂);
  alkynyl, in particular propargyl, homopropargyl (—(CH₂)₂—C≡CH);
  or monovalent group (V) defined above, in particular:

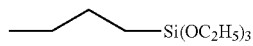

Still in formula (II) and preferably, the symbols $T_3$ and $T_4$ both correspond to hydrogen or together form an aryl and even better still a phenyl.

By way of examples of carbenes, mention may be made of those described in table 2, page 48 of the publication "Bourissou et al. Chem. Rev. 2000, 100, 39-91".

The amount of polycondensation catalyst A according to the invention may be between 0.1% and 10% by weight of the total weight of the composition X according to the invention, and preferably between 0.1% and 5% by weight.

All the viscosities to which reference is made in the present report correspond to a magnitude of dynamic viscosity which is measured, in a manner known per se, at 25° C. The viscosities are measured using a Brookfield viscometer according to the indications of AFNOR standard NFT 76-102. These viscosities correspond to a magnitude of dynamic viscosity at 25° C. termed "Newtonian", i.e. the dynamic viscosity which is measured, in a manner known per se, at a shear rate gradient that is sufficiently low for the measured viscosity to be independent of the rate gradient.

Description of the Silicone Base B:

The silicone bases used in the present invention that crosslink or cure via polycondensation reactions are well known. These bases are described in detail in particular in numerous patents and they are commercially available.

The elements contained in the silicone bases can be packaged in several packagings, so as to separate certain elements in order to prevent an early or unfavourable reaction before use. For example, silicone bases can be packaged in at least two fractions, one fraction comprising only the polycondensation catalyst A in an alcoholic solution and one or more separate fractions comprising the other reagents of the composition X.

The silicone base B used to produce the composition according to the invention may comprise:
  at least one polyorganosiloxane oil or gum C that is polymerizable or crosslinkable, via polycondensation, into an elastomer and that has a dynamic viscosity at 25° C. of between 10 mPa·s and 1.5×10⁶ mPa·s;
  optionally at least one crosslinking agent D;
  optionally at least one adhesion promoter E; and
  optionally at least one nonsiliceous, organic and/or siliceous mineral filler F.

The polyorganosiloxane oil or gum C is preferably an α,ω-dihydroxypolydiorganosiloxane polymer with a dynamic viscosity at 25° C. of between 10 and 1 500 000 mPa·s, and the organic radicals of which are hydrocarbon-based radicals, preferably chosen from the group consisting of: alkyls having from 1 to 20 carbon atoms; cycloalkyls having from 3 to 8 carbon atoms; alkenyls having from 2 to 8 carbon atoms and cycloalkenyls having from 5 to 8 carbon atoms.

In one specific embodiment of the compositions X according to the invention, the polyorganosiloxane oil or gum C may also comprise at least two functional groups of hydroxyl, alkoxy, oxime, acyl and/or enoxy type and/or preferably at least two silanol functional groups.

The crosslinking agent D is preferably an organosilicon compound bearing more than two hydrolyzable groups bonded to the silicon atoms per molecule.

As crosslinking agent D, mention may be made of:
silanes of the following general formula:

in which the symbols $R^2$, which are identical or different, represent alkyl radicals having from 1 to 8 carbon atoms, such as methyl, ethyl, propyl, butyl, pentyl or 2-ethylhexyl radicals, $C_3$-$C_6$ oxyalkylene radicals, the symbol $R^1$ represents a linear or branched, saturated or unsaturated, aliphatic hydrocarbon-based group, a saturated or unsaturated and/or aromatic, monocyclic or polycyclic carbocyclic group, and k is equal to 0, 1 or 2; and the products of partial hydrolysis of this silane.

As an example of $C_3$-$C_6$ alkoxyalkylene radicals, mention may be made of the following radicals:

$CH_3OCH_2CH_2$—

$CH_3OCH_2CH(CH_3)$—

$CH_3OCH(CH_3)CH_2$—

$C_2H_5OCH_2CH_2CH_2$—

In one specific embodiment, the symbol $R^1$ can also represent a $C_1$-$C_{10}$ hydrocarbon-based radical encompassing:

$C_1$-$C_{10}$ alkyl radicals such as methyl, ethyl, propyl, butyl, pentyl, 2-ethylhexyl, octyl or decyl radicals;

vinyl and allyl radicals; and $C_5$-$C_8$ cycloalkyl radicals such as phenyl, tolyl and xylyl radicals.

The crosslinking agents D are products that are available on the silicones market; furthermore, their use in room-temperature curing compositions is known; it occurs in particular in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Preference is more particularly given, among the crosslinking agents D, to alkyltrialkoxysilanes, alkyl silicates and alkyl polysilicates, in which the organic radicals are alkyl radicals having from 1 to 4 carbon atoms.

As other examples of crosslinking agents D that may be used, mention is more particularly made of the following silanes:

propyltrimethoxysilane,
methyltrimethoxysilane,
ethyltrimethoxysilane,
vinyltrimethoxysilane,
vinyltriethoxysilane,
methyltriethoxysilane,
propyltriethoxysilane,
tetraethoxysilane,
tetrapropoxysilane,
1,2-bis(trimethoxysilyl)ethane,
1,2-bis(triethoxysilyl)ethane, and
tetraisopropoxysilane,
or else: $CH_3Si(OCH_3)_3$; $C_2H_5Si(OC_2H_5)_3$; $C_2H_5Si(OCH_3)_3$ $CH_2$=$CHSi(OCH_3)_3$; $CH_2$=$CHSi(OCH_2CH_2OCH_3)_3$ $C_6H_5Si(OCH_3)_3$; $[CH_3][OCH(CH_3)CH_2OCH_3]Si[OCH_3]_2$ $Si(OCH_3)_4$; $Si(OC_2H_5)_4$; $Si(OCH_2CH_2CH_3)_4$; $Si(OCH_2CH_2CH_3)_4$ $Si(OC_2H_4OCH_3)_4$; $CH_3Si(OC_2H_4OCH_3)_3$; $ClCH_2Si(OC_2H_5)_3$.

Even more preferably, the crosslinking agent D is chosen from the group consisting of
vinyltrimethoxysilane,
vinyltriethoxysilane,
methyltriethoxysilane,
propyltriethoxysilane,
tetraethoxysilane,
1,2-bis(triethoxysilyl)ethane,
$C_2H_5Si(OC_2H_5)_3$, and
$Si(OC_2H_5)_4$.

As other examples of crosslinking agent D, mention may be made of ethyl polysilicate or n-propyl polysilicate.

In general, from 0.1 to 60 parts by weight of crosslinking agent D per 100 parts by weight of polyorganosiloxane oil or gum C are used.

In one preferred embodiment, the crosslinking agent D is a silicone resin H, the hydroxyl function weight content of which is between 0.1% and 20% by weight.

The adhesion promoter E optionally present in the compositions according to the invention may be chosen, for example, from organosilicon compounds bearing both:
(1) one or more hydrolyzable groups bonded to the silicon atom, and
(2) one or more organic groups substituted with radicals comprising a nitrogen atom or chosen from the group of (meth)acrylate, epoxy and alkenyl radicals, and even more preferentially from the group consisting of the following compounds taken alone or as a mixture: vinyltrimethoxysilane (VTMO),
3-glycidoxypropyltrimethoxysilane (GLYMO),
methacryloxypropyltrimethoxysilane (MEMO),
$[H_2N(CH_2)_3]Si(OCH_2CH_2CH_3)_3$,
$[H_2N(CH_2)_3]Si(OCH_3)_3$,
$[H_2N(CH_2)_3]Si(OC_2H_5)_3$,
$[H_2N(CH_2)_4]Si(OCH_3)_3$,
$[H_2NCH_2CH(CH_3)CH_2CH_2]SiCH_3(OCH_3)_2$,
$[H_2NCH_2]Si(OCH_3)_3$,
$[n-C_4H_9-HN-CH_2]Si(OCH_3)_3$,
$[H_2N(CH_2)_2NH(CH_2)_3]Si(OCH_3)_3$,
$[H_2N(CH_2)_2NH(CH_2)_3]Si(OCH_2CH_2OCH_3)_3$,
$[CH_3NH(CH_2)_2NH(CH_2)_3]Si(OCH_3)_3$,
$[H(NHCH_2CH_2)_2NH(CH_2)_3]Si(OCH_3)_3$,

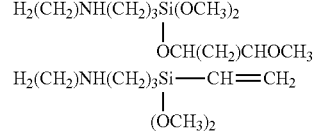

or polyorganosiloxane oligomers containing such organic groups in a content greater than 20%.

Very finely divided products, the average particle diameter of which is less than 0.1 μm, can be used as mineral fillers F. Among these fillers are fumed silicas and precipitated silicas; their BET specific surface area is generally greater than 40 m$^2$/g. These fillers may also be in the form of more coarsely divided products with an average particle diameter greater than 0.1 μm. As examples of such fillers, mention may be made of ground quartz, diatomaceous silicas, calcium carbonate, calcined clay, rutile-type titanium oxide, iron, zinc, chromium, zirconium or magnesium oxides, the various forms of alumina to (hydrated or unhydrated), boron nitride, lithopone, barium metaborate, barium sulfate and glass microbeads; their specific surface area is generally less than 30 m$^2$/g.

These fillers may have been surface-modified by treatment with the various organosilicon compounds customarily employed for this purpose. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126

884, FR-A-1 136 885 and FR-A-1 236 505, and British patent GB-A-1 024 234). The treated fillers contain, in most cases, from 3 to 30% of their weight of organosilicon compounds. The fillers may be constituted of a mixture of several types of fillers of different particle size; thus, for example, they may be constituted of 30 to 70% of finely divided silicas with a BET specific surface area greater than 40 m²/g and of 70 to 30% of more coarsely divided silicas with a specific surface area less than 30 m²/g.

The introduction of the fillers makes it possible to give good mechanical and rheological properties to the elastomers that result from the curing of the compositions in accordance with the invention.

In combination with these fillers, use may be made of mineral and/or organic pigments and also agents that improve the thermal resistance (salts and oxides of rare-earth elements such as ceric oxides and hydroxides) and/or the fire resistance of the elastomers. For example, the oxide cocktails described in international application WO 98/29488 can be used. Among the agents that improve the fire resistance, mention may be made of halogenated organic derivatives, organophosphorus derivatives, platinum derivatives such as chloroplatinic acid (its products from reaction with alkanols, ether oxides), and platinous chloride-olefin complexes. These pigments and agents together represent at most 20% of the weight of the fillers.

Other usual additives and auxiliary agents may be incorporated into the composition according to the invention; they are chosen according to the applications in which said compositions are used.

The silicone base used to prepare the composition according to the invention may comprise:
  per 100 parts of polyorganosiloxane oil C capable of crosslinking via polycondensation into an elastomer;
  from 0 to 20 parts of a crosslinking agent D;
  from 0 to 20 parts of an adhesion promoter E; and
  from 0 to 50 parts of filler F.

In addition to the main constituents, nonreactive linear polyorganosiloxane polymers G' may be introduced with the intention of acting on the physical characteristics of the compositions in accordance with the invention and/or on the mechanical properties of the elastomers resulting from the curing of these compositions.

These nonreactive linear polyorganosiloxane polymers G' are well known; they comprise more especially: $\alpha,\omega$-bis(triorganosiloxy)diorganopolysiloxane polymers with viscosities of at least 10 mPa·s at 25° C., formed essentially from diorganosiloxy units and from at most 1% of monoorganosiloxy and/or siloxy units, the organic radicals bonded to the silicon atoms being chosen from methyl, vinyl and phenyl radicals, 60% at least of these organic radicals being methyl radicals and 10% at most being vinyl radicals. The viscosity of these polymers can reach several tens of millions of mPa·s at 25° C.; they therefore include oils with a fluid to viscous appearance and soft to hard gums. They are prepared according to the usual techniques described more precisely in French patents FR-A-978 058, FR-A-1 025 150, FR-A-1 108 764 and FR-A-1 370 884. Use is preferably made of $\alpha,\omega$-bis(trimethylsiloxy)dimethylpolysiloxane oils with a viscosity ranging from 10 mPa·s to 1000 mPa·s at 25° C. These polymers, which act as plasticizers, can be introduced in a proportion of at most 70 parts, preferably of 5 to 20 parts, per 100 parts of the polyorganosiloxane oil or gum C capable of polymerizing or crosslinking via polycondensation.

The compositions according to the invention can in addition advantageously comprise at least one silicone resin H. These silicone resins are branched organopolysiloxane polymers which are well known and which are available commercially. They have, per molecule, at least two different units chosen from those of formula $R'''_3SiO_{1/2}$ (M unit), $R'''_2SiO_{2/2}$ (D unit), $R'''SiO_{3/2}$ (T unit) and $SiO_{4/2}$ (Q unit). The R''' radicals are identical or different and are chosen from linear or branched alkyl radicals or vinyl, phenyl or 3,3,3-trifluoropropyl radicals. Preferably, the alkyl radicals have from 1 to 6 carbon atoms inclusive. More particularly, mention may be made, as alkyl R radicals, of methyl, ethyl, isopropyl, tert-butyl and n-hexyl radicals. These resins are preferably hydroxylated and, in this case, have a hydroxyl group weight content of between 5 and 500 meq/100 g.

As an example of resins, mention may be made of the MQ resins, the MDQ resins, the TD resins and the MDT resins.

When the silicone resin H is also used as a crosslinking agent D, a silicone resin with silanol functions comprising, per molecule, at least one siloxyl unit $M=R'_3SiO_{1/2}$ and/or one siloxyl unit $D=R'_2SiO_{2/2}$ in combination with at least one siloxyl unit $T=R'SiO_{3/2}$ and/or one siloxyl unit $Q=SiO_{4/2}$, will preferably be chosen; the radicals R' being chosen from the group consisting of methyl, ethyl, isopropyl, tert-butyl and n-hexyl groups.

The compositions X according to the invention can be used in the preparation of elastomers, in particular of elastomers in the form of gels, sealants and/or coats for thin-layer coating.

In order to obtain such elastomers, the various fundamental constituents of the composition are mixed, preferably in a dry atmosphere, and, where appropriate, the adjuvants and additives are added thereto.

Thus, it is possible to mix first of all the organopolysiloxane oils C and the fillers F and to then add, to the paste obtained, the crosslinking agents D, the compounds E and the catalytic composition Y'. It is also possible to mix the oils C, the crosslinking agents D, the compounds E and the fillers F and to subsequently add the catalytic composition Y'. During these operations, the mixtures may be heated at a temperature within the range of 40-180° C., for example between 40 and 130° C., under atmospheric pressure or under a reduced pressure in order to promote the removal of volatile materials.

After the deposition of the compositions as they are, onto solid substrates, in a humid atmosphere, it is observed that a process of curing into elastomers occurs.

The compositions may be used for multiple applications such as jointing in the construction industry, assembling the most diverse materials (metals, plastics, natural and synthetic rubbers, wood, board, earthenware, brick, ceramic, glass, stone, concrete, masonry units), insulating electrical conductors, the coating of electronic circuits, or the preparation of molds used for manufacturing articles made of synthetic resins or foams.

The compositions and/or elastomers obtained according to the invention may be used for multiple applications such as jointing and/or adhesive bonding in the construction industry or the transportation industry (examples: motor vehicle, aerospace, railway, maritime and aeronautic), assembling the most diverse materials (metals, plastics, natural and synthetic rubbers, wood, board, polycarbonate, earthenware, brick, ceramic, glass, stone, concrete and masonry units), insulating electrical conductors, the coating of electronic circuits and the preparation of molds used for manufacturing articles made of synthetic resins or foams.

The elastomer precursor composition according to the invention can be used in particular as a coating base for the production of coatings which are, for example, release coatings and/or water-repellent in nature, or for the production of dressings or patches.

Another subject of the invention is an elastomer obtained by crosslinking or curing a precursor composition X according to the invention and as defined above.

Another subject of the invention consists of the use of at least one catalytic composition Y' according to the invention and as defined above, for the synthesis of silicone elastomers from a silicone base comprising an oil or gum B which is polymerizable or crosslinkable via a polycondensation reaction and which has a dynamic viscosity of between 10 mPa·s and $1.5 \times 10^6$ mPa·s at 25° C.

Thus, the invention also relates to a process for preparing a coated support Y comprising the following steps a), b) and c):
- a) a silicone-based elastomer precursor composition X as defined above is prepared,
- b) said silicone-based elastomer precursor composition X is then deposited continuously or batchwise onto a flexible support which may be made of a textile, paper, polyvinyl chloride, polyester, polypropylene, polyamide, polyethylene, polyurethane, nonwoven glass fiber fabrics, or polyethylene terephthalate, and
- c) said composition X is left to crosslink, optionally by heating at a temperature between 40° C. and 130° C., so as to cure said composition X and thus to obtain the coated support Y.

Advantageously, in such a process, the composition X comprises
- at least one polyorganosiloxane oil or gum C, said oil or gum C being (i) crosslinkable via a polycondensation reaction and having (ii) a dynamic viscosity of between 10 mPa·s and $1.5 \times 10^6$ mPa·s at 25° C.; and
- a crosslinking agent D which is a silicone resin, the hydroxyl function weight content of which is between 0.1% and 20% by weight.

In accordance with this process, the compositions can be applied by means of devices used on industrial machines for coating paper, such as a five-roll coating head, air knife systems or equalizing bar systems, to flexible supports or materials, and then cured by moving through tunnel ovens heated, for example, to a temperature of between 40 and 130° C., for example between 100 and 110° C.

Said compositions can be deposited on any flexible material or substrate, such as paper of various types (supercalendered, coated, glassine), cardboard, cellulose sheets, metal sheets, plastic films (polyester, polyethylene, polypropylene, etc).

The amounts of compositions deposited are of the order of 0.5 to 2 g per m² of area to be treated, which corresponds to the deposition of layers of the order of 0.5 to 2 μm.

The materials or supports thus coated can subsequently be brought into contact with any pressure-sensitive rubber, acrylic or other adhesive materials. The adhesive material is then easily detachable from said support or material.

The flexible supports coated with a silicone film may be, for example:
- an adhesive tape, the internal face of which is coated with a pressure-sensitive adhesive layer and the external face of which comprises the silicone coating;
- or a paper or a polymer film for protecting the adhesive face of a self-adhesive or pressure-sensitive adhesive element;
- or a polymer film of the polyvinyl chloride (PVC), polypropylene, polyethylene or polyethylene terephthalate type.

In one specific embodiment, the coated support Y is a dressing.

The compositions according to the invention are also of use in the field of release coatings on paints, the encapsulation of electrical and electronic components, and coatings for textiles, and also in the field of the sheathing of optical fibers.

A subject of the invention is also any coatings obtained by crosslinking and/or polymerizing the composition X according to the invention and as defined above. These coatings may be of varnish, adhesive coating, release coating and/or ink type.

The invention is also directed toward:
- any articles consisting of a solid material, at least one surface of which is coated with the abovementioned thermally polymerized and/or crosslinked composition X;
- and also a crosslinked silicone foam obtained by crosslinking an above-mentioned composition X.

Other advantages and features of the present invention will appear on reading the following examples that are given by way of illustration and that are in no way limiting.

EXAMPLES

1) Dealkoxypolycondensation Catalyzed by N-Heterocyclic Carbenes (NHCs) and Comparison with Tin Salts at Room Temperature RTV1 test for single-component compositions: A polydimethylsiloxane oil blocked at each of its ends with a vinyldimethoxysilyl unit, prepared from an α,ω-dihydroxylated polydimethylsiloxane oil having a viscosity of 100 mPa·s and from vinyltrimethoxysilane (VTMO) in the presence of lithium hydroxide as functionalization catalyst, is mixed with a polycondensation catalyst which is either dibutyltin dilaurate (DBTDL) or a catalytic composition according to the invention formed from the carbene NHC-$^t$Bu (1,3-di-tert-butylimidazolinylidene) in solution at 30% by weight in methanol.

RTV2 test for two-component compositions: An α,ω-dihydroxylated polydimethylsiloxane oil having a viscosity of 100 mPa·s is mixed with ethyl silicate (Si(OEt)$_4$/OH molar ratio=1) or the same weight of precondensed ethyl silicate and with, as polycondensation catalyst, either dibutyltin dilaurate (DBTDL) or a catalytic composition according to the invention comprising the carbene NHC-$^t$Bu in solution at 30% by weight in methanol.

The amount of DBTDL used in the tests is 0.5 mol of catalyst per mole of OH provided by the oil, i.e. 1.24 mmol of DBTDL for 4.5 g of α,ω-dihydroxylated polydimethylsiloxane oil containing 0.55 mmol of OH per gram.

In the case of the catalytic compositions according to the invention, tests with 0.02, 0.1 and 0.2 mol of carbene per mole of OH were carried out.

Table 1 gives the reaction time required to obtain the same degree of dealkoxypolycondensation for each test.

TABLE 1

Reaction time required to obtain the same degree of dealkoxypolycondensation

| Test | Catalyst | mol catalyst/mol OH | RTV2 Test crosslinking agent = Si(OEt)$_4$ | RTV1 Test |
|---|---|---|---|---|
| 1 | DBTDL | 0.5 | 1h10 | 0h30 |
| 2 | NHC-tBu | 0.02 | 1h30* | 24h |
| 3 | NHC-tBu | 0.1 | 0h03 | 5h |
| 4 | NHC-tBu | 0.2 |  | 1h40 |

*1h with precondensed ethyl silicate

These tests show that the catalytic composition according to the invention (carbene NHC-tBu in solution at 30% by weight in methanol) is a very good catalyst in RTV2 since, with 0.1 mol of carbene per mole of OH, a degree of conversion comparable to that obtained in 1 h 10 min with 0.5 mol of tin catalyst per mole of OH, is obtained in 3 minutes.

For the RTV1 tests, when going from 0.5 mol of tin catalyst per mole of OH to 0.2 mol of carbene catalyst per mole of OH (the number of moles of catalyst is reduced by 60%), the time required to obtain the same degree of conversion is increased by approximately 60%. They therefore have a comparable activity.

2) Production of Elastomer in the Presence of a Silicone Oil, Precondensed Ethyl Silicate and an NHC Carbene in Solution at Room Temperature Test 5-a: 50 g of α,ω-dihydroxylated polydimethylsiloxane oil having a viscosity of 14 000 mPa·s are mixed with 0.38 g of precondensed ethyl silicate at 14 mol of OEt per kg (i.e. an OEt/OH molar ratio=2.92), and a catalytic composition according to the invention formed with 0.21 mmol of carbene catalyst NHC-tBu in solution at 30% by weight in methanol, which corresponds to 0.09 mol of carbene catalyst per mole of OH. Immediately after mixing, a gel is obtained which results in a tacky, pasty elastomer.

Test 5-b: 50 g of α,ω-dihydroxylated polydimethylsiloxane oil having a viscosity of 14 000 mPa·s are mixed with 0.38 g of precondensed ethyl silicate at 14 mol of OEt per kg (i.e. an OEt/OH molar ratio=2.92), and 0.043 mmol of carbene catalyst NHC-tBu in solution at 30% by weight in methanol. A gel with a pot life of 1 to 2 h is obtained, which results in an elastic, tacky, transparent elastomer.

If the carbene NHC-tBu in solution at 30% by weight in methanol is replaced with the same molar amount of carbene NHC-Cy (1,3-dicyclohexylimidazolylidene in methanolic solution), the same result is obtained.

A very small amount of catalyst according to the invention is sufficient to catalyze the polycondensation and to obtain an elastomer.

Other tests were carried out while reducing the amount of crosslinking agent, so as to have an initial OEt/OH ratio of less than 1: The pot life is identical, between 1 and 2 h, the elasticities are greater, but in all cases the material obtained is a transparent, elastic, flexible, tacky gel, the characteristics of which are stable after a few days.

Test 5-c: 50 g of α,ω-dihydroxylated polydimethylsiloxane oil having a viscosity of 14 000 mPa·s are mixed with 0.27 g of precondensed ethyl silicate at 14 mol of OEt per kg (OEt/OH molar ratio=0.9), and 0.043 mmol of carbene catalyst NHC-tBu in solution at 30% by weight in methanol. A gel with a pot life of 1 to 2 h is obtained, which results in an elastic, tacky, transparent elastomer.

Test 5-d: 50 g of α,ω-dihydroxylated polydimethylsiloxane oil having a viscosity of 14 000 mPa·s are mixed with 0.095 g of precondensed ethyl silicate at 14 mol of OEt per kg (OEt/OH molar ratio=0.73), and 0.043 mmol of carbene catalyst NHC-tBu in solution At 30% by weight in methanol. A gel with a pot life of 1 to 2 h is obtained, which results in an elastic, tacky, transparent elastomer.

3) Dehydropolycondensation Catalyzed by N-Heterocyclic Carbenes (NHCs) at Room Temperature Two catalytic compositions were prepared from:
an N-heterocyclic carbene-tBu (NHC-tBu) in pure crystalline form and in methanolic solution (30% by weight), and
a carbene NHC-Cy in ethanolic solution (40% by weight) or methanolic solution (31% by weight).

Test 6: α,ω-dihydroxylated polydimethylsiloxane oil having a viscosity of 100 mPa·s and carbene NHC-tBu in crystal form An α,ω-dihydroxylated polydimethylsiloxane oil having a viscosity of 100 mPa·s is placed in the presence of 0.5% by weight of NHC-tBu in crystal form (0.28 mmol per 10 g of oil) with stirring at room temperature so as to obtain a dehydrocondensation reaction. The medium turns cloudy after 30 minutes of stirring, the stirring stops after one hour (increase in viscosity) and, after 24 h, a gum with a very high viscosity (not measurable but greater than 200 000 mPa·s) is obtained.

Test 7: α,ω-Dihydroxylated polydimethylsiloxane oil having a viscosity of 100 mPa·s and carbene NHC-Cy in ethanolic solution The same experimental conditions as test 6 are used, with the exception of the catalytic composition, which is replaced with the same molar amount of NHC-Cy in ethanolic solution (40% by weight). After stiffing for 24 h at room temperature, an oil having a viscosity of 116 000 mPa·s is obtained and, after heating for 4 h at 80° C., a gum with a very high viscosity (>200 000 mPa·s but not measurable) is obtained.

The following table 2 gives the characteristics of the gums obtained according to tests 1 and 2, analyzed by size exclusion chromatography (GPC).

TABLE 2

|  | Mp | Mn | Mw | PD | Composition by weight |
|---|---|---|---|---|---|
| α,ω-Dihydroxylated PDMS oil having a viscosity of 100 mPa · s | 5630 | 3410 | 7160 | 1.29 | 23% between 63 100 and 10 000<br>73% between 10 000 and 1000 |
| Gum Test 6 | '88 310 | 24 190 | 108 770 | 4.5 | 39% between 1 155 620 and 100 000<br>53% between 100 000 and 10 000<br>7% between 10 000 and 1000 |
| Gum Test 7 | 238 320 | 165 100 | 381 200 | 2.3 | 86% between 4 877 500 and 100 000<br>14% between 100 000 and 10 000 |

Test 8: α,ω-Dihydroxylated polydimethylsiloxane oil having a viscosity of 14 000 mPa·s and carbene in methanolic solution An α,ω-dihydroxylated polydimethylsiloxane oil having a viscosity of 14 000 mPa·s is placed in the presence of a catalytic composition formed from 0.1% by weight of NHC-tBu in methanolic solution (30% by weight).

The following table 3 shows the monitoring of viscosity of the mixture (in mPa·s) obtained with test 8, and table 4 shows the results of analysis by size exclusion chromatography (GPC).

TABLE 3

| time (h) | viscosity (mPa · s) |
|---|---|
| 0.0 | 15 720 |
| 0.1 | 16 100 |
| 0.3 | 17 440 |
| 0.6 | 19 000 |
| 0.9 | 21 160 |
| 1.1 | 23 250 |
| 2.1 | 32 040 |
| 3.1 | 43 560 |
| 3.6 | 48 060 |
| 4.8 | 67 320 |
| 6.0 | 85 080 |
| 6.9 | 99 360 |
| 20.9 | >200 000 |

TABLE 4

| time | Mp | Mn | Mw | PD | Composition by weight |
|---|---|---|---|---|---|
| 0 α,ω-OH PDMS oil | 54 230 | 44 900 | 73 400 | 1.64 | 23% between 735 000 and 100 000; 76% between 100 000 and 10 000 |
| 24 h | 109 000 | 92 600 | 203 700 | 2.2 | 61.3% between 2 550 500 and 100 000; 38% between 100 000 and 10 000 |
| 25 days | 204 000 | 157 300 | 367 600 | 2.3 | 82.5% between 5 370 000 and 100 000; 17.5% between 100 000 and 10 000 |

Tests 9 to 13:

For each of the tests, the constituents detailed in table 5 hereinafter were mixed at room temperature with a catalytic composition formed from 0.1% by weight of carbene NHC-Cy (31% by weight in methanolic solution), i.e. 0.42 mmol of NHC-Cy per 100 g of mixture.

The various constituents of table 5 are:

an α,ω-dihydroxylated polydimethylsiloxane oil having a viscosity of 750 mPa·s, denoted "H750", an α,ω-dihydroxylated polydimethylsiloxane oil having a viscosity of 14 000 mPa·s, containing 0.0324 mmol OH/g, denoted "H14000" and a branched hydroxylated silicone oil containing in total 0.547 mmol of OH/g and with a $T^{OH}/D^{OH}$ ratio=7.72, denoted "OH crosslinking agent A".

Test 12 corresponds to a stoichiometry between the OH of the H14000 oil and the OH of the crosslinking agent A, and test 13 corresponds to the stoichiometry of all of the $D^{OH}$ that are present (in the H14000 oil and the OH crosslinking agent A) relative to the $T^{OH}$ of the OH crosslinking agent A.

TABLE 5

| | Tests | | | | |
|---|---|---|---|---|---|
| | 9 | 10 | 11 | 12 | 13 |
| H750 | | 80 g | | | |
| H14000 | | | 80 g | 93.74 g | 92 g |
| OH Crosslinking agent A | 100 g | 20 g | 20 g | 6.26 g | 8 g |

For all of tests 9 to 13 carried out, the pot life of the mixture is more than two hours. The characteristics of the various elastomers obtained are detailed hereinafter.

Test 9: gelled, elastic, non-tacky at 18 h, then hard and brittle.
Test 10: gelled, slightly tacky at 18 h, firm, not very tacky at 3 days, hard, non-tacky at 7 d.
Test 11: gelled, strongly tacky and elastic at 18 h, elastic, very tacky at 3 d, hard, tacky at 7 d and 14 d.
Tests 12 and 13: after 18 h, gelled but oily at the surface, upper film-coating not crosslinked after 3 d, quite elastic and tacky at 7 d and 14 d. A fraction of the compositions of tests 9 to 13 was spread in a thin layer in cupels and brought to 120° C. For all the tests, a non-tacky crosslinked elastomer was obtained in less than 5 minutes.

Tests 14 to 19:

In order to compare the activity of the carbenes NHC-Cy (31% by weight in methanolic solution) and NHC-tBu (30% by weight in methanolic solution), the constituents detailed in table 6 hereinafter were mixed at room temperature with 0.21 mmol of carbene. The various constituents of table 6 are the "H14000" oil described above and a hydroxylated resin denoted "OH crosslinking agent B", containing 0.303 mmol of OH per gram. Tests 16 and 17 are at stoichiometry between the oil and the resin.

TABLE 6

| Test | 14 | 15 | 16 | 17 | 18 | 19 |
|---|---|---|---|---|---|---|
| NHC-Cy | x | | x | | x | x |
| NHC-tBu | | x | | x | | |
| H14000 | 37.4 g | 37.4 g | 37.4 g | 37.4 g | 37.4 g | 37.4 g |
| OH Crosslinking agent B | 2 g | 2 g | 4 g | 4 g | 8 g | 12 g |
| Pot life | 1 h 30 | 2 h | 2 h 30 | 3 h 30 | 4 h 15 | 6 h |

The pot life obtained with the various compositions ranges between 1 h 30 min and 6 hours. The characteristics of the various elastomers obtained are detailed hereinafter.

Tests 14 and 16: tacky gel at 3 h 30 min, tacky elastomer at 6 h 30 min, non-tacky at 22 h.
Tests 15 and 17: tacky gel at 3 h 30 min, tacky elastomer at 22 h and 14 days.
Tests 18 and 19: non-tacky elastomers at 22 h.

In the same way as for tests 9 to 13, a fraction of the compositions of tests 14 to 19 was spread in a thin layer in cupels and brought to 120° C. For all the tests, a non-tacky crosslinked elastomer was obtained in less than 5 minutes.

These results show that the carbenes in alcoholic solution allow a reaction between an α,ω-dihydroxylated polydimethylsiloxane oil and a resin comprising $D^{OH}$ and $T^{OH}$ motifs in order to obtain elastomers in thin layers in a few minutes at 120° C., whatever the resin comprising $D^{OH}$ and $T^{OH}$ siloxyl units, the α,ω-dihydroxylated polydimethylsiloxane oil and the proportions of the two.

In the $D^{OH}$ and $T^{OH}$ siloxyl units, the substituents other than the hydroxyl function are methyls.

The invention claimed is:

1. A silicone-based elastomer precursor composition X comprising:
   a silicone base B comprising at least one polyorganosiloxane oil or gum C, said oil or gum C being (i) polymerizable or crosslinkable via a polycondensation reaction and having (ii) a dynamic viscosity of from 10 mPa.s to $1.5 \times 10^6$ mPa.s at 25° C.; and
   a catalytic composition Y' comprising:
   a) a catalytically effective amount of at least one polycondensation catalyst A which is a carbene of formula (I) below:

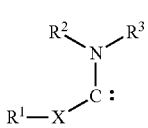
(I)

with:
   the symbol X being selected from the group consisting of the following atoms or groups: —O—, —S—, —N(R)— and —P(R)— with R being a $C_1$-$C_{30}$ group,
   $R^1$, $R^2$ and $R^3$ being identical or different, optionally substituted, $C_1$-$C_{30}$ groups optionally comprising one or more atoms selected from the group consisting of: S, P, Si, N and O, and
   the symbols X, $R^1$, $R^2$ and $R^3$ taken in pairs can form a 5-, 6- or 7-membered ring, and
   b) at least one solvent comprising at least one alcohol G.

2. The composition X as claimed in claim 1, wherein the catalyst A has the formula (II) or (II'):

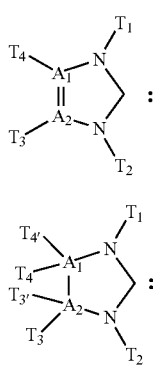

in which:
the symbols $A_1$ and $A_2$ independently represent a carbon or nitrogen atom, it being understood that:
1) in formula (II), when the symbol $A_1$ represents a nitrogen atom, then the symbol $T_4$ is not present, and when the symbol $A_2$ represents a nitrogen atom, then the symbol $T_3$ is not present; and
2) in formula (II'), when the symbol $A_1$ represents a nitrogen atom, then the symbol $T_4$ or $T_{4'}$ is not present, and when the symbol $A_2$ represents a nitrogen atom, then the symbol $T_3$ or $T_{3'}$ is not present;
the symbols $T_3$, $T_{3'}$, $T_4$ and $T_{4'}$ independently represent a hydrogen atom; or one of the following groups: alkyl, cycloalkyl optionally substituted with an alkyl or alkoxy group; aryl optionally substituted with an alkyl or alkoxy group, alkenyl, alkynyl or arylalkyl in which the aryl part is optionally substituted with an alkyl or alkoxy group;
the symbols $T_3$ and $T_4$ can form, together and with $A_1$ and $A_2$ when the latter each represent a carbon atom, an aryl;
the symbols $T_1$, $T_2$, $T_3$, $T_{3'}$, $T_4$ and $T_{4'}$ can form, in pairs, when they are located on two adjacent ring members in formulae (II) and (II'), a saturated or unsaturated hydrocarbon-based chain, and
the symbols $T_1$ and $T_2$ represent, independently of one another:
1) one of the following groups: alkyl, a cycloalkyl optionally substituted with an alkyl group, alkyl which is perfluorinated or optionally substituted with a perfluoroalkyl group, cycloalkyl optionally substituted with an alkyl or alkoxy group; aryl optionally substituted with an alkyl or alkoxy group, alkenyl, alkynyl or arylalkyl in which the aryl part is optionally substituted with an alkyl or alkoxy group; or
2) a monovalent radical of formula (IV) below:

—V1-V2 (IV)

in which:
V1 is a saturated or unsaturated, divalent hydrocarbon-based group, which is optionally substituted, and
V2 is a monovalent group selected from the group consisting of the following substituents:
   alkoxy, —OR$^a$ with the symbol R$^a$ corresponding to a hydrogen atom or an alkyl or aryl group;
   silyl, —Si(OR$^b$)$_x$(R$^c$)$_{3-x}$ with the symbol R$^b$ corresponding to a hydrogen atom or an alkyl, silyl or siloxanyl group, with the symbol R$^c$ corresponding to an alkyl or aryl group and the symbol x being an integer equal to 0, 1, 2 or 3; and
   amine.

3. The composition X as claimed in claim 1, wherein the alcohol G has the formula R°OH, in which R° corresponds to one of the following groups: alkyl, cycloalkyl, aryl, alkenyl, alkynyl, arylalkyl, silyl or siloxane.

4. The composition X as claimed in claim 1, wherein the silicone base B comprises polyorganosiloxane oil C which is an α,ω-dihydroxydiorganopolysiloxane polymer, the organic radicals of which are hydrocarbon-based radicals.

5. The composition X as claimed in claim 1, wherein the silicone base B also comprises:
   at least one crosslinking agent D;
   optionally at least one adhesion promoter E; and
   optionally at least one siliceous, organic and/or non-siliceous mineral filler F.

6. The composition X as claimed in claim 5, wherein the crosslinking agent D is selected from the group consisting of:
   vinyltrimethoxysilane,
   vinyltriethoxysilane,
   methyltriethoxysilane,
   propyltriethoxysilane,
   tetraethoxysilane,
   1,2-bis(triethoxysilyl)ethane,
   $C_2H_5Si(OC_2H_5)_3$, and
   $Si(OC_2H_5)_4$.

7. The composition X as claimed in claim 5, wherein the crosslinking agent D is a silicone resin H, the hydroxyl function weight content of which is from 0.1% to 20% by weight.

8. The composition X as claimed in claim 5, wherein the crosslinking agent D is a silicone resin H with silanol functions comprising, per molecule, at least one siloxyl unit M=R'$_3$SiO$_{1/2}$ and/or one siloxyl unit D=R'$_2$SiO$_{2/2}$ in combination with at least one siloxyl unit $T=R'SiO_{3/2}$ and/or one siloxyl unit $Q=SiO_{4/2}$; the radicals R' being at least one selected from the group consisting of methyl, ethyl, isopropyl, tert-butyl and n-hexyl groups.

9. An elastomer obtained by crosslinking or curing a precursor composition X as defined in claim 5.

10. The composition X as claimed in claim 1, wherein the silicone base B comprises a polyorganosiloxane oil C that comprises at least two silanol functional groups.

11. The composition X as claimed in claim 5, comprising the least one adhesion promoter E.

12. The composition X as claimed in claim 5, comprising the least one filler F.

13. The composition X as claimed in claim 1, wherein the silicone base B comprises a polyorganosiloxane oil C that comprises at least two functional groups of hydroxyl, alkoxy, oxime, acyl and/or enoxy type.

14. A process for preparing a coated support Y comprising the following steps a), b) and c):
   a) a silicone-based elastomer precursor composition X as defined in claim 1 is prepared,
   b) said silicone-based elastomer precursor composition X is then deposited continuously or batchwise onto a flexible support S which is made of a textile, paper, polyvinyl chloride, polyester, polypropylene, polyamide, polyethylene, polyurethane, nonwoven glass fiber fabrics, or polyethylene terephthalate, and
   c) said silicone composition X is left to crosslink, optionally by heating at a temperature from 40° C. to 130° C., so as to cure the silicone composition X and thus to obtain the coated support Y.

15. The process as claimed in claim 14, wherein the silicone-based elastomer precursor composition X comprises:
   at least one polyorganosiloxane oil or gum C, said oil or gum C being (i) crosslinkable via a polycondensation reaction and having (ii) a dynamic viscosity of from 10 mPa.s to $1.5 \times 10^6$ mPa.s at 25° C.; and
   a crosslinking agent D which is a silicone resin, the hydroxyl function weight content of which is from 0.1% to 20% by weight.

16. The process as claimed in claim 15, wherein the coated support Y is a dressing.

17. The process as claimed in claim 14, wherein the coated support Y is a dressing.

18. A coated support Y prepared according to claim 14.

19. The composition X as claimed in claim 1, wherein the alcohol G has the formula R°OH, in which R° is selected from the group consisting of: a methyl, an ethyl, a propyl and a butyl.

20. The composition X as claimed in claim 1, wherein the polyorganosiloxane oil C is an α,ω-dihydroxydiorganopolysiloxane polymer, the organic radicals of which are selected from the group consisting of: alkyls having from 1 to 20 carbon atoms, cycloalkyls having from 3 to 8 carbon atoms, alkenyls having from 2 to 8 carbon atoms and cycloalkenyls having from 5 to 8 carbon atoms.

* * * * *